US007286939B2

(12) United States Patent
Bachrach et al.

(10) Patent No.: US 7,286,939 B2
(45) Date of Patent: Oct. 23, 2007

(54) METHOD FOR ESTIMATING POROSITY AND SATURATION IN A SUBSURFACE RESERVOIR

(75) Inventors: Ran Bachrach, Houston, TX (US); Nader Dutta, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 40 days.

(21) Appl. No.: 10/511,713

(22) PCT Filed: Oct. 28, 2003

(86) PCT No.: PCT/US03/34209

§ 371 (c)(1),
(2), (4) Date: May 8, 2006

(87) PCT Pub. No.: WO2005/052639

PCT Pub. Date: Jun. 9, 2005

(65) Prior Publication Data

US 2006/0212225 A1   Sep. 21, 2006

(51) Int. Cl.
    *G01V 1/28* (2006.01)
(52) U.S. Cl. ...................................... 702/14
(58) Field of Classification Search ............... 702/13, 702/12, 11, 14, 17
    See application file for complete search history.

(56) References Cited

U.S. PATENT DOCUMENTS

| 4,992,993 A | 2/1991 | Chambers |
| 5,521,881 A | 5/1996 | Lau et al. |
| 5,539,704 A | 7/1996 | Doyen et al. |
| 5,640,368 A | 6/1997 | Krebs |
| 6,094,620 A | 7/2000 | Gasparotto et al. |
| 6,169,959 B1 | 1/2001 | Dragoset, Jr. |
| 6,507,787 B1 | 1/2003 | Da Silva et al. |

FOREIGN PATENT DOCUMENTS

WO   WO 01/96904   12/2001

OTHER PUBLICATIONS

Doyen et al., "Seismic porosity mapping in the Ekofisk Field using a new form of collocated cokriging," *Society of Petroleum Engineers, SPE*, pp. 21-30, Oct. 6-9, 1999.
International Search Report dated Jun. 28, 2004 for Application No. PCT/US03/34209.
Lörtzer and Berkhout, "An integrated approach to lithologic inversion—Part I: Theory," *Geophys.*, 57(2):233-244, 1992.

*Primary Examiner*—Donald E McElheny, Jr.
(74) *Attorney, Agent, or Firm*—Ari Pramudji; Liangang (Mark) Ye; Jeffrey E. Griffin

(57) ABSTRACT

A method and apparatus for estimating a porosity and a saturation in a subsurface reservoir. The method includes determining a plurality of mathematical relationships relating a plurality of fundamental physical parameters that govern elastic wave propagation in the subsurface reservoir to the porosity and the saturation in the subsurface reservoir, forward modeling a plurality of seismic attributes using the mathematical relationships to derive a plurality of conditional probability density functions for the seismic attributes, applying a Bayesian inversion to the conditional probability density functions for the seismic attributes to derive a joint probability density function for the porosity and the saturation in the subsurface reservoir, and integrating the joint probability density function for the porosity and the saturation to derive a probability density function for the porosity and a probability density function for the saturation.

20 Claims, 2 Drawing Sheets

METHOD FOR ESTIMATING POROSITY AND SATURATION IN A SUBSURFACE RESERVOIR

BACKGROUND OF THE INVENTION

1. Field of the Invention

Embodiments of the present invention generally relate to a method for estimating subsurface reservoir properties, such as porosity and saturation.

2. Description of the Related Art

For many years seismic exploration for oil and gas has been conducted by use of a source of seismic energy and the reception of the energy generated by the source by an array of seismic detectors. On land, the source of seismic energy may be a high explosive charge or another energy source having the capacity to deliver a series of impacts or mechanical vibrations to the earth's surface. Acoustic waves generated by these sources travel downwardly into the earth's subsurface and are reflected back from strata boundaries and reach the surface of the earth at varying intervals of time, depending on the distance traveled and the characteristics of the subsurface traversed. These returning waves are detected by the sensors, which function to transduce such acoustic waves into representative electrical signals. The detected signals are recorded for later processing using digital computers. Typically, an array of sensors is laid out along a line to form a series of detection locations. More recently, seismic surveys are conducted with sensors and sources laid out in generally rectangular grids covering an area of interest, rather than along a single line, to enable construction of three dimensional views of reflector positions over wide areas. Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

Initially, seismic traces were used simply for ascertaining formation structure. Recently, however, exploration geophysicists have subsequently developed a plurality of time-series transformations of seismic traces to obtain a variety of characteristics that describe the traces, which are generally referred to as "attributes". Attributes may be computed prestack or poststack. Poststack attributes include reflection intensity, instantaneous frequency, reflection heterogeneity, acoustic impedance, velocity, dip, depth and azimuth. Prestack attributes include moveout parameters such as amplitude-versus-offset (AVO), and interval and average velocities.

It has been observed that specific seismic attributes are related to specific subsurface properties. For example, reservoir porosity and the hydrocarbon saturation may be estimated from surface seismic data to predict the amount of oil or gas reserves in the subsurface reservoirs. Generally, the reservoir porosity is estimated while keeping the hydrocarbon saturation fixed, and the hydrocarbon saturation is estimated while keeping the reservoir porosity fixed. Such methodology, however, often leads to inaccurate estimates of the porosity and saturation.

Therefore, a need exists in the art for an improved method for estimating porosity and saturation in a subsurface reservoir.

SUMMARY OF THE INVENTION

Embodiments of the present invention are generally directed to a method for estimating a porosity and a saturation in a subsurface reservoir. The method includes determining a plurality of mathematical relationships relating a plurality of fundamental physical parameters that govern elastic wave propagation in the subsurface reservoir to the porosity and the saturation in the subsurface reservoir, forward modeling a plurality of seismic attributes using the mathematical relationships to derive a plurality of conditional probability density functions for the seismic attributes, applying a Bayesian inversion to the conditional probability density functions for the seismic attributes to derive a joint probability density function for the porosity and the saturation in the subsurface reservoir, and integrating the joint probability density function for the porosity and the saturation to derive a probability density function for the porosity and a probability density function for the saturation.

In one embodiment, the method further includes mapping the probability density function for the porosity to a plurality of observed seismic attributes to generate an estimate for the porosity.

In another embodiment, the method further includes mapping the probability density function for the saturation to a plurality of observed seismic attributes to generate an estimate for the saturation.

In yet another embodiment, the fundamental physical parameters are a bulk modulus (K), a shear modulus (G) and a bulk density ($\rho$).

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims.

DETAILED DESCRIPTION

Figure 1:
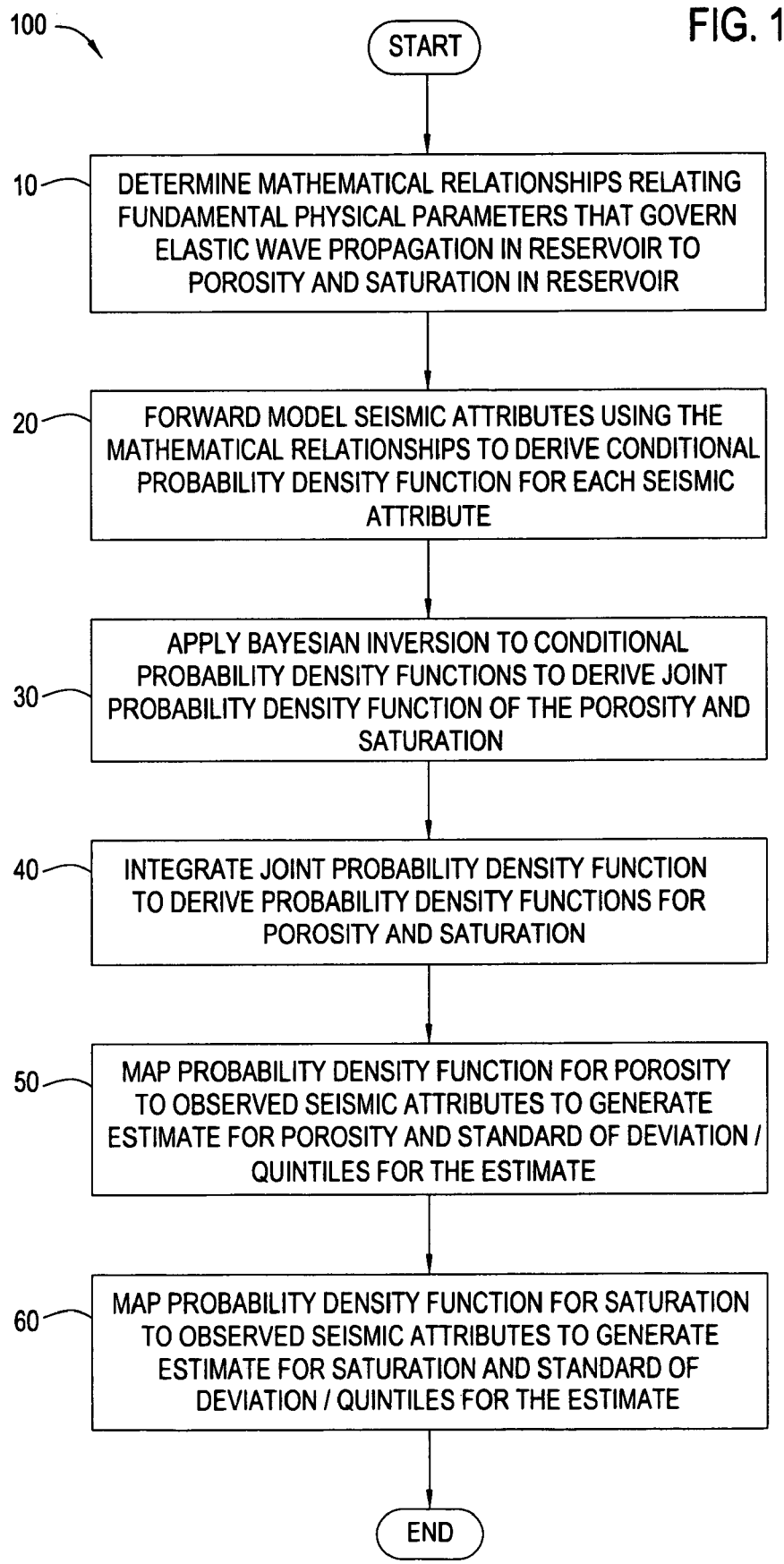
FIG. 1 illustrates a flow diagram of a method for estimating reservoir porosity and hydrocarbon saturation in a subsurface reservoir in accordance with one embodiment of the invention.

FIG. 1 illustrates a flow diagram of a method 100 for estimating reservoir porosity and hydrocarbon saturation in a subsurface reservoir in accordance with one embodiment of the invention. At step 10, mathematical relationships relating the fundamental physical parameters that govern the elastic wave propagation in the subsurface reservoir to the porosity and the saturation in the subsurface reservoir are determined. For a linear isotropic subsurface reservoir, the fundamental physical parameters are the bulk modulus (K), the shear modulus (G) and the bulk density ($\rho$). As such, the bulk modulus (K) is a function of the porosity and the saturation, the shear modulus G is a function of the porosity, and the bulk density (ρ) is a function of the porosity and the saturation. In one embodiment, the mathematical relationships are determined using rock physics relations, including Biot-Gassmann relations. Other types of media may require mathematical relationships relating other fundamental physical parameters to the porosity and the saturation.

At step 20, one or more seismic attributes (e.g., seismic velocity, acoustic impedance, shear impedance, far offset impedance, etc) are forward modeled using the mathematical relationships, e.g., the bulk modulus (K), the shear modulus (G) and the bulk density (ρ). Generally, seismic attributes are fields that are related to the fundamental physical parameters governing the seismic wave propagation in the subsurface reservoir, e.g., the bulk modulus (K), the shear modulus G, and the bulk density (ρ). For example, compression wave velocity (Vp) and shear wave velocity (Vs) are related to the fundamental physical parameters by the following equations:

$$Vp = sqrt\ [(K+4G/3)/\rho] \qquad \text{(Equation 1)}$$

$$Vs = sqrt\ (G/\rho) \qquad \text{(Equation 2)}.$$

Acoustic impedance is related to the fundamental physical parameters by the following equation:

$$AI = Vp * \rho \qquad \text{(Equation 3)}.$$

Shear impedance is related to the fundamental physical parameters by the following equation:

$$SI = Vs * \rho \qquad \text{(Equation 4)}.$$

As such, the seismic attributes may be simulated using the mathematical relationships relating the fundamental physical parameters that govern the elastic wave propagation in the subsurface reservoir to the porosity and the saturation in the subsurface reservoir.

In one embodiment, the seismic attributes are forward modeled using stochastic rock physics, such as Monte Carlo simulation. As such, a plurality of porosity and saturation values is randomly drawn, a seismic attribute is simulated, and a conditional probability density function for the seismic attribute is derived. The process is then repeated for all the seismic attributes. In this manner, the conditional probability density functions for all the seismic attributes are synthetically derived without using actual seismic data. The conditional probability density function may also be referred to as the likelihood function.

At step 30, the joint probability density function of the porosity and the saturation is derived. In one embodiment, a Bayesian inversion is applied to the conditional probability density functions for the seismic attributes to derive the joint probability density function for the porosity and the saturation. In the previous step, the conditional probability density functions for the seismic attributes were derived, given the porosity and saturation values. Using the Bayesian inversion, the joint probability density function for the porosity and the saturation may be derived, given the seismic attributes. The joint probability density function for the porosity and the saturation may be expressed as:

$$p(\phi, sw|ATR) = p(\phi, sw) \times p(ATR|\phi, sw)/p(ATR) \qquad \text{(Equation 5)},$$

where $p(\phi, sw)$ represents the prior expected porosity and saturation distribution in the reservoir, $p(ATR|\phi, sw)$ represents the conditional probability density functions of the seismic attributes given the porosity and the saturation values, and $p(ATR)$ represents the prior distribution of the seismic attributes.

At step 40, the marginal probability density functions for the porosity and the saturation are derived. In one embodiment, the marginal probability density functions for the porosity and the saturation are derived by integrating the joint probability density function for the porosity and the saturation. In this manner, a separate probability density function for the porosity is derived and a separate probability density function for the saturation is derived. The probability density function for the porosity may be expressed as:

$$p(\phi|ATR) = \int p(\phi, sw|ATR) dsw \qquad \text{(Equation 6)}.$$

The probability density function for the saturation may be expressed as:

$$p(sw|ATR) = \int p(\phi, sw|ATR) d\phi \qquad \text{(Equation 7)}.$$

At step 50, the probability density function for the porosity is mapped to a set of observed seismic attributes to generate an estimate for the porosity in the subsurface reservoir for the set of observed seismic attributes. A set of observed seismic attributes may include one or more observed seismic attributes. For example, a set of observed seismic attributes may include three observed seismic attributes—compression wave velocity, shear wave velocity and density. In one embodiment, the probability density function of porosity is mapped to the set of observed seismic attributes using a maximum a posteriori (MAP) estimator. As such, the most likely porosity value is selected from the probability density function for porosity for the set of observed seismic attributes. In a further embodiment, the standard deviation or quintiles of distribution for the estimated porosity value may be generated.

At step 60, the probability density function for saturation is mapped to a set of observed seismic attributes to generate an estimate for the saturation in the subsurface reservoir for the set of observed seismic attributes. As mentioned above, a set of observed seismic attributes may include any number of observed seismic attributes. In one embodiment, the probability density function of saturation is mapped to the observed seismic attributes using a maximum a posteriori (MAP) estimator. As such, the most likely saturation value is selected from the probability density function for saturation for the set of observed seismic attributes. In a further embodiment, the standard deviation or quintiles of distribution for the estimated saturation value may be generated.

Figure 2:
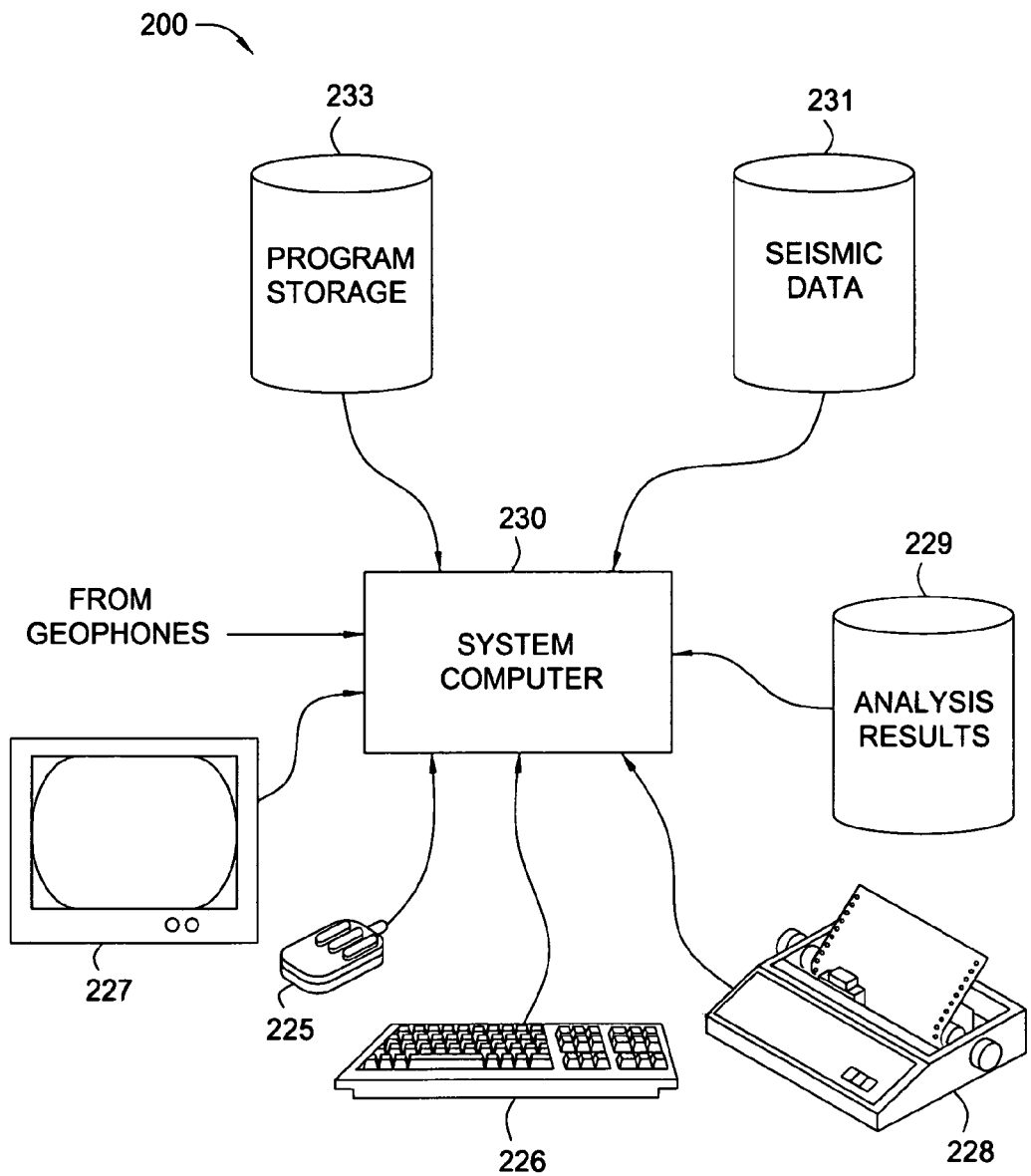
FIG. 2 illustrates a computer network into which embodiments of the invention may be implemented.

FIG. 2 illustrates a computer network 200, into which embodiments of the invention may be implemented. The computer network 200 includes a system computer 230, which may be implemented as any conventional personal computer or workstation, such as a UNIX-based workstation. The system computer 230 is in communication with disk storage devices 229, 231, and 233, which may be external hard disk storage devices. It is contemplated that disk storage devices 229, 231, and 233 are conventional hard disk drives, and as such, will be implemented by way of a local area network or by remote access. Of course, while disk storage devices 229, 231, and 233 are illustrated as separate devices, a single disk storage device may be used to store any and all of the program instructions, measurement data, and results as desired.

In one embodiment, seismic data from geophones are stored in disk storage device 231. The system computer 230 may retrieve the appropriate data from the disk storage device 231 to perform the porosity and saturation estimation according to program instructions that correspond to the methods described herein. The program instructions may be written in a computer programming language, such as C++, Java and the like. The program instructions may be stored in a computer-readable memory, such as program disk storage device 233. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 230 presents output primarily onto graphics display 227, or alternatively via printer 228. The system computer 230 may store the results of the methods described above on disk storage 229, for later use and further analysis. The keyboard 226 and the pointing device (e.g., a mouse, trackball, or the like) 225 may be provided with the system computer 230 to enable interactive operation.

The system computer 230 may be located at a data center remote from the survey region. The system computer 230 is in communication with geophones (either directly or via a recording unit, not shown), to receive signals indicative of the reflected seismic energy. These signals, after conventional formatting and other initial processing, are stored by the system computer 230 as digital data in the disk storage 231 for subsequent retrieval and processing in the manner described above. While FIG. 2 illustrates the disk storage 231 as directly connected to the system computer 230, it is also contemplated that the disk storage device 231 may be accessible through a local area network or by remote access. Furthermore, while disk storage devices 229, 231 are illustrated as separate devices for storing input seismic data and analysis results, the disk storage devices 229, 231 may be implemented within a single disk drive (either together with or separately from program disk storage device 233), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for estimating a porosity and a saturation in a subsurface reservoir, comprising:
   determining a plurality of mathematical relationships relating a plurality of fundamental physical parameters that govern elastic wave propagation in the subsurface reservoir to the porosity and the saturation in the subsurface reservoir;
   forward modeling a plurality of seismic attributes using the mathematical relationships to derive a plurality of conditional probability density functions for the seismic attributes;
   applying a Bayesian inversion to the conditional probability density functions for the seismic attributes to derive a joint probability density function for the porosity and the saturation in the subsurface reservoir; and
   integrating the joint probability density function for the porosity and the saturation to derive a probability density function for the porosity and a probability density function for the saturation.

2. The method of claim 1, further comprising mapping the probability density function for the porosity to a set of observed seismic attributes to generate an estimate for the porosity for the set of observed seismic attributes.

3. The of method of claim 2, wherein the probability density function for the porosity is mapped to the observed seismic attributes using a maximum a posteriori estimator.

4. The of method of claim 2, further comprising generating one of a standard deviation and one or more quintiles for the estimate for the porosity.

5. The method of claim 1, further comprising mapping the probability density function for the saturation to a set of observed seismic attributes to generate an estimate for the saturation for the set of observed seismic attributes.

6. The of method of claim 5, wherein the probability density function for the saturation is mapped to the observed seismic attributes using a maximum a posteriori estimator.

7. The of method of claim 5, further comprising generating one of a standard deviation and one or more quintiles for the estimate for the saturation.

8. The method of claim 1, wherein the step of forward modeling comprises:
   randomly drawing a plurality of porosity and saturation values;
   simulating the seismic attributes from the porosity and saturation values; and
   deriving the conditional probability density functions for the seismic attributes.

9. The method of claim 1, wherein the fundamental physical parameters comprise a bulk modulus (K), a shear modulus (G) and a bulk density ($\rho$).

10. The method of claim 1, wherein the mathematical relationships are determined using rock physics.

11. The method of claim 1, wherein the seismic attributes are forward modeled using stochastic rock physics.

12. A computer readable medium containing a program which, when executed, performs an operation, comprising:
   determining a plurality of mathematical relationships relating a plurality of fundamental physical parameters that govern elastic wave propagation in the subsurface reservoir to the porosity and the saturation in the subsurface reservoir;
   forward modeling a plurality of seismic attributes using the mathematical relationships to derive a plurality of conditional probability density functions for the seismic attributes;
   applying a Bayesian inversion to the conditional probability density functions for the seismic attributes to derive a joint probability density function for the porosity and the saturation in the subsurface reservoir; and
   integrating the joint probability density function for the porosity and the saturation to derive a probability density function for the porosity and a probability density function for the saturation.

13. The computer readable medium of claim 12, wherein the operation further comprises mapping the probability density function for the porosity to a plurality of observed seismic attributes to generate an estimate for the porosity.

14. The computer readable medium of claim 12, wherein the operation further comprises mapping the probability density function for the saturation to a plurality of observed seismic attributes to generate an estimate for the saturation.

15. The computer readable medium of claim 12, wherein the step of forward modeling comprises:
   randomly drawing a plurality of porosity and saturation values;
   simulating the seismic attributes from the porosity and saturation values; and
   deriving the conditional probability density functions for the seismic attributes.

16. The computer readable medium of claim 12, wherein the fundamental physical parameters comprise a bulk modulus (K), a shear modulus (G) and a bulk density ($\rho$).

17. The computer readable medium of claim 12, wherein the mathematical relationships are determined using rock physics.

18. The computer readable medium of claim 12, wherein the seismic attributes are forward modeled using stochastic rock physics.

19. A method for estimating a porosity and a saturation in a subsurface reservoir, comprising:
   determining a plurality of mathematical relationships relating a plurality of fundamental physical parameters that govern elastic wave propagation in the subsurface reservoir to the porosity and the saturation in the subsurface reservoir;
   forward modeling a plurality of seismic attributes using the mathematical relationships to derive a plurality of conditional probability density functions for the seismic attributes;
   applying a Bayesian inversion to the conditional probability density functions for the seismic attributes to derive a joint probability density function for the porosity and the saturation in the subsurface reservoir;
   integrating the joint probability density function for the porosity and the saturation to derive a probability density function for the porosity and a probability density function for the saturation;
   mapping the probability density function for the porosity to a set of observed seismic attributes to generate an estimate for the porosity for the set of observed seismic attributes; and
   mapping the probability density function for the saturation to a set of observed seismic attributes to generate an estimate for the saturation for the set of observed seismic attributes.

20. The method of claim 19, wherein the fundamental physical parameters comprise a bulk modulus (K), a shear modulus (G) and a bulk density ($\rho$).

* * * * *